United States Patent [19]
Dao

[11] Patent Number: 5,570,463
[45] Date of Patent: Oct. 29, 1996

[54] BRESENHAM/DDA LINE DRAW CIRCUITRY

[75] Inventor: Giang H. Dao, Houston, Tex.

[73] Assignee: Compaq Computer Corporation, Houston, Tex.

[21] Appl. No.: 414,047

[22] Filed: Mar. 30, 1995

Related U.S. Application Data

[63] Continuation of Ser. No. 1,085, Jan. 6, 1993, abandoned.
[51] Int. Cl.$^6$ ................................................. G06F 15/00
[52] U.S. Cl. ................................................. 395/143
[58] Field of Search ................................ 395/141, 143, 395/142; 345/136, 132

[56] References Cited

U.S. PATENT DOCUMENTS

| | | | |
|---|---|---|---|
| 4,593,372 | 6/1986 | Bandai et al. | 364/719 |
| 4,882,683 | 11/1989 | Rupp et al. | 364/521 |
| 5,073,960 | 12/1991 | Nakoi et al. | 382/22 |
| 5,202,960 | 4/1993 | Seiler | 395/143 |
| 5,261,034 | 11/1993 | Kawata | 395/143 |
| 5,287,442 | 2/1994 | Alcorn et al. | 395/143 |
| 5,297,244 | 3/1994 | Pomichter, Jr. | 395/143 |
| 5,305,432 | 4/1994 | Kubota | 395/143 |
| 5,309,553 | 5/1994 | Mukai et al. | 395/143 |

*Primary Examiner*—Phu K. Nguyen
*Attorney, Agent, or Firm*—Vinson & Elkins L.L.P.

[57] ABSTRACT

A line draw engine for generating Bresenham and DDA lines includes an adder, circuitry for generating a control sign indicative of whether a Bresenham or a DDA line is desired, circuitry for selectively inverting an output of the adder responsive to the control signal and Bresenham line draw logic coupled to the adder and the control signal for drawing a next point responsive to the output of the inverting circuitry.

15 Claims, 2 Drawing Sheets

BRESENHAM/DDA LINE DRAW CIRCUITRY

RELATED APPLICATIONS

This application is a continuation of application Ser. No. 08/001,085, filed Jan. 6, 1993, and entitled "Bresenham/DDA Line Draw Circuitry", now abandoned.

TECHNICAL FIELD OF THE INVENTION

This invention relates in general to computer display systems, and more particularly to a method and apparatus for performing both DDA and Bresenham lines.

BACKGROUND OF THE INVENTION

There are two basic methods of drawing lines on a discrete integer mesh, such as the pixel array of a computer display. In drawing lines on an integer mesh, a step between points in the line is always made in the major direction (a horizontal step in the first octant) and the only decision to be made by the line draw engine is whether to also make a step in the minor direction (a vertical step in the first octant) thereby resulting in a diagonal step. In order to draw a line in this fashion, most line draw circuitry employs either a Bresenham engine or a DDA (Digital Differential Analyzer) engine.

A Bresenham line draw engine 10 is illustrated in FIG. 1. The Bresenham line draw engine comprises line draw logic 12 coupled to an adder 14. An initial error value, E0, is loaded into the accumulator of the adder 14. Constants K1 and K2 are computed prior to drawing the line, and input to the Bresenham line draw logic 12. For each step in the major direction, the line draw logic 12 determines whether a step in the minor direction should also be made. Hence, for a first octant lines, the Bresenham line draw engine determines whether a horizontal step is made or whether a upwardly diagonal step is made. If a horizontal (major) step is made, then K1 is added to the error in the accumulator. If a diagonal (major and minor) step is made, then K2 is added to the error in the adder 14. The Bresenham line draw logic 12 determines whether to make a major axis or diagonal step based on the sign of the error term stored in the accumulator of the adder 14.

A DDA line, on the other hand, uses fractional arithmetic. The DDA line draw engine typically comprises an accumulator for the integer and fraction approximation of the slope. Because binary arithmetic requires that fractions be represented in a finite number of bits, a DDA line may suffer from accumulated error.

Most graphics boards with line draw capabilities employ either a Bresenham or a DDA line draw engine. In many cases, it is desirable to have capability of drawing both Bresenham and DDA lines. For example, Bresenham lines assume integer end-points. For non-integer end-point lines, the Bresenham algorithm does not give the best matched pixels with the ideal line. DDA lines can handle arbitrary end-points, but require a significant number of fractional bits to achieve the precision of a Bresenham line. Generally, it is easier to implement anti-aliasing and shading with DDA lines than with Bresenham lines.

Therefore, a need has arisen in the industry for a line draw engine capable of producing both Bresenham and DDA lines.

SUMMARY OF THE INVENTION

In accordance with the present invention, a method and apparatus for drawing both DDA and Bresenham lines is provided which provides substantial advantages over the prior art.

In the present invention, an apparatus for generating Bresenham and DDA lines comprises an adder, circuitry for generating a control signal indicative of whether a Bresenham or a DDA line is desired, circuitry for selectively inverting an output of the adder responsive to the control signal and Bresenham line draw logic coupled to the adder and the control signal for drawing a line segment responsive to the output of the inverting circuitry.

The present invention provides significant advantages over the prior art in that it can be adapted to an existing Bresenham line draw engine with only minor design modifications. The modified Bresenham line draw engine is then enabled to generate both Bresenham and DDA lines, and thus, gains the benefit of each line draw method.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 2:
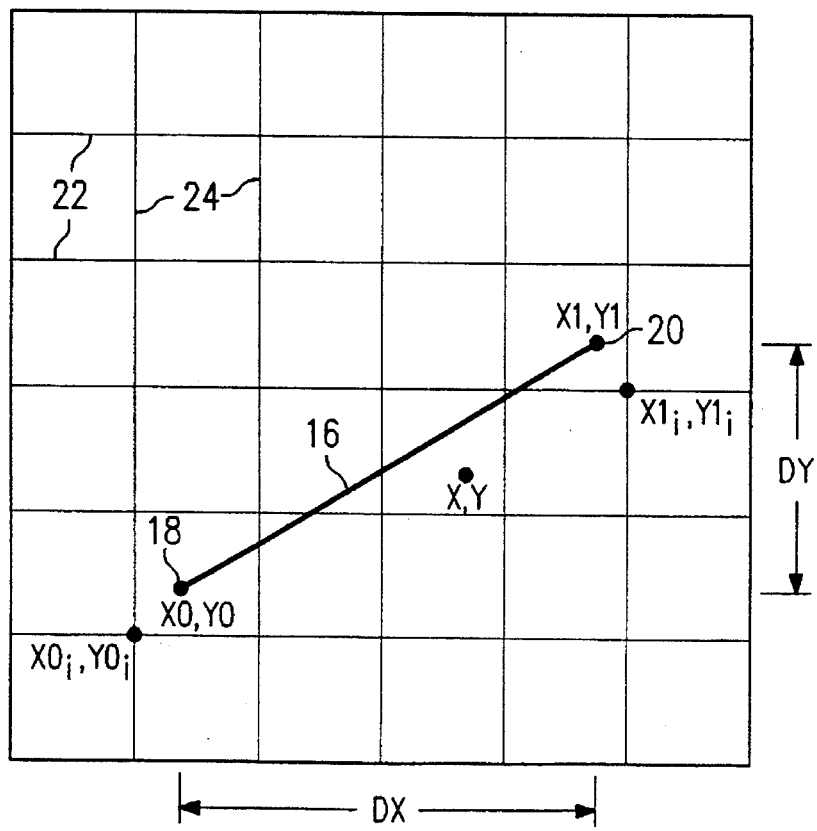
FIG. 2 illustrates a exemplary line to be drawn on a discrete integer mesh.
Figure 3:
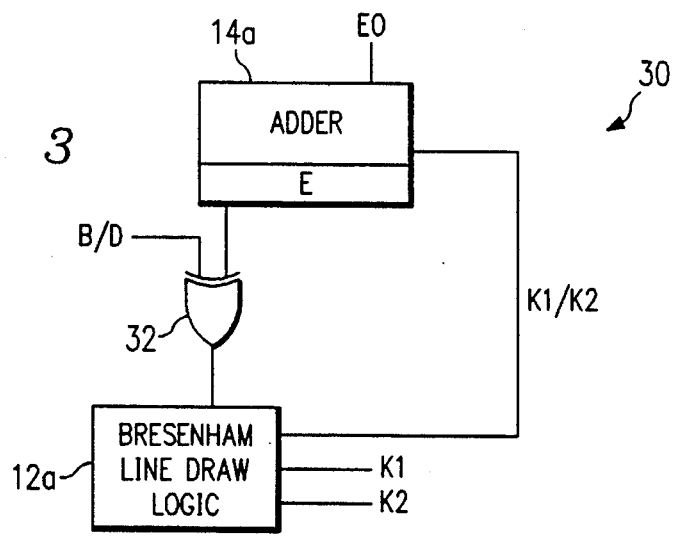
FIG. 3 illustrates a modified Bresenham line draw engine having the capability to produce both Bresenham and DDA lines.
Figure 4:
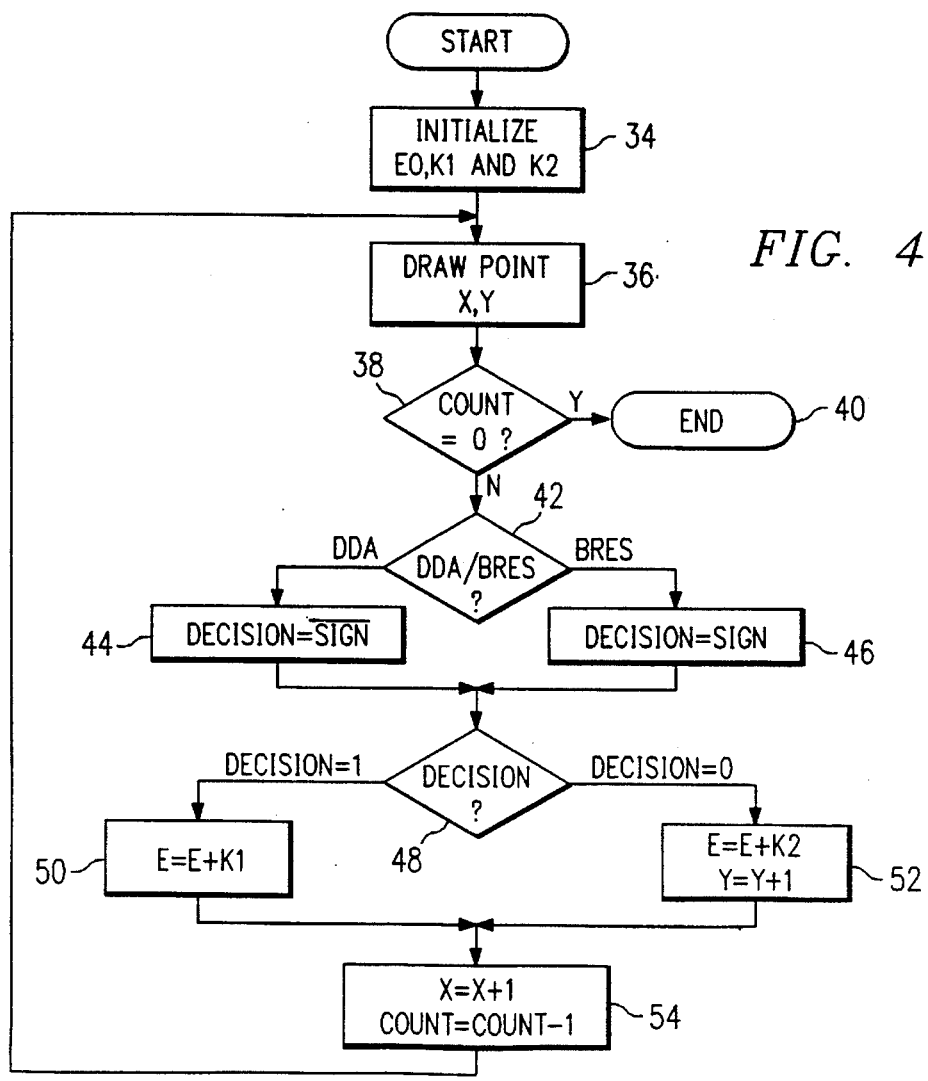
FIG. 4 illustrates a flow chart describing the operation of the modified Bresenham engine of FIG. 3.

The preferred embodiment of the present invention and its advantages are best understood by referring to FIGS. 2–4 of the drawings, like numerals being used for like and corresponding parts of the various drawings.

FIG. 2 illustrates an exemplary line 16 between two real end-points 18 and 20 designated by the coordinates X0,Y0 and X1,Y1. The line is drawn across a grid of intersecting horizontal lines 22 and vertical lines 24, the intersection of which represents pixel locations. For a point X,Y in the grid, a function F(X,Y) can be defined as $$F(X,Y)=2*DY*(X-X0)-2*DX*(Y-Y0)$$

where

DY=Y1−Y0 (positive real number for the first octant)

DX=X1−X0 (positive real number and DX>DY for first octant lines); and

X,Y are real coordinates.

As is the convention, this detailed description assumes that the lines are in the first octant; however, lines in other octants can be achieved using symmetry. In the above equation, F(X,Y) has a value equal to zero for points on the line, a positive value for points below the line and a negative value for points above the line. The magnitude of F(X,Y) is proportional to the distance between the point and the line. The expression for any point can be derived from a previously known point as:

$$F(X+dx,Y+dy)=2*DY*(X-X0)-2*DX*(Y-Y0)+2*DY*dx-2DX*dy$$
$$F(X+dx,Y+dy)=F(X,Y)+2*DY*dx-2DX,dy \quad (1)$$

where dx and dy are arbitrary offsets from X,Y.

For the Bresenham major stepping term, dx=1, dy=0. Hence, Bresenham constant K1 can be described as:

$$K1=F(X+1,Y)-F(X,Y)=2*DY \quad (2)$$

Likewise, for the Bresenham diagonal-stepping term, dx=1, dy=1. Consequently, Bresenham constant K2 can be described as:

$$K2=F(X+1,Y+1)-F(X,Y)=2*DY-2*DX \quad (3)$$

The best estimate of a line having non-integer end-points will start with the closest integer end-point to each of the non-integer end-points. Thus, if the line draw starts at an integer point $(X0_i, Y0_i)$ which is closest to non-integer end-point $(X_0, Y_0)$, then:

$$F(X0_i,Y0_i)=F(X0,Y0)+2*DY*(X0_i-X0)-2*DX*(Y0_i-Y0)$$

Since F(X0,Y0)=0, because point (X0,Y0) is on the line, $$F(X0_i,Y0_i)=2*DY*(X0_i-X0)-2*DX*(Y0_i-Y0) \quad (4)$$

The Bresenham initial midpoint error term, E0, can be described as:

$$E0=F(X0_i+1,Y0_i+\tfrac{1}{2})$$

Using the property of F(X,Y) in expression (1)

$$E0=2*DY-DX+F(X0_i,Y0_i)$$

$$E0=2*DY-DX+2*DY*(X0_i-X0)-2*DX*(Y0_i-Y0\times 5)$$

Equation (5) is similar to the Bresenham error term with integer endpoints, with the last two terms $2*DY*(X0_i-X0)-2*DX*(Y0_i-Y0))$ being an adjustment needed for the non-integer endpoint.

The sign of the midpoint error term is used to select the next stepping point. If the midpoint error term is negative, then a step in the major direction is taken and K1 is added to the error term. On the other hand, if the midpoint error term is positive, a diagonal step is taken and K2 is added to the error term. If (X0,Y0) and (X1,Y1) are described using n-bit integer and f-bit fraction portions, K1, K2 and E0 will require (n+2)-bit integer portions and f-bit fraction portions for error-free operation. Alternatively, K1, K2 and E0 can be multiplied by $2^f$ to turn constants into integers. The total of the integer bits required would then equal (n+f+2). Note that the E0 calculation would then require two integer multiplications.

By dividing expressions (2), (3) and (5) by the factor 2*DX, constants for the DDA line may be derived:

$$S=K1/2DX=DY/DX \quad (6)$$

$$K2/2DX=DY/DX-1=S-1 \quad (7)$$

$$E0/2DX=(DY/DX)*(1+X0_i-X0)-(\tfrac{1}{2}+Y0_i-Y0)$$

$$E0/2DX=S+S*(X0_i-X0)-(Y0_i-Y0)-\tfrac{1}{2} \quad (8)$$

$$F0=1+E0/2DX=S+S*(X0_i-X0)-(Y0_i-Y0)-\tfrac{1}{2} \quad (9)$$

where

S is the slope of the line (S<1).

F0 is the initial fraction.

Since F0=1+E0/2DX, the decision is made on whether F0 is smaller than or greater than 1, rather than zero as described for the Bresenham method. If F0 is less than 1, S is added into F0 and stepping is in the major axis direction. If F0 is greater than 1, S is added to F0 and 1 is subtracted from the resulting F0 (i.e., F0=F0+S−1). In this case, stepping is in the diagonal direction.

Figure 1:
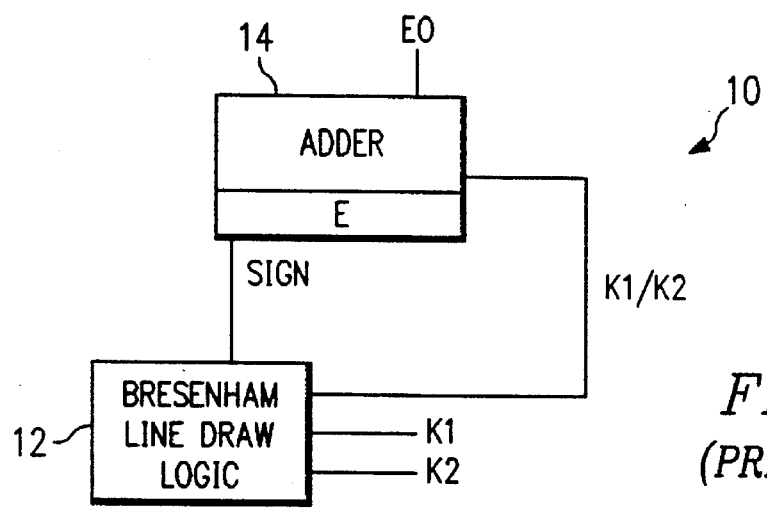
FIG. 1 illustrates a Bresenham line draw engine.

FIGS. 3 and 4 illustrate a line draw engine for generating both DDA and Bresenham lines. The line draw engine 30 uses adder 14a and Bresenham line draw logic 12a which can be identical to the adder 12 and logic 14 shown in the prior art line draw engine 10 of FIG. 1. This ability allows the circuit designer to provide both Bresenham and DDA line draw capabilities with minimal changes to an existing line draw engine design.

The adder 14a of line draw engine 30 is a (n+f+2)-bit adder, for n-bit integer, f-fraction coordinates. An exclusive OR gate 32 receives an output from the adder (SIGN) indicative of the sign of the Bresenham error parameter E and a signal indicative of the type of line to be drawn (B/D). For the circuit of FIG. 3, B/D=0 for Bresenham lines and B/D=1 for DDA lines. When E is negative (SIGNa=1), a step in the major axis direction is taken and K1 is added to E. When E is positive (SIGNa=0), a diagonal step is taken and K2 is added to E0.

For Bresenham lines, E0, K1 and K2 are calculated as in the prior art case. For DDA lines, E0, K1 and K2 are calculated as follows:

$$K1_{DDA}=2^{(n+f+1)}*S \quad (10)$$

$$K2_{DDA}=2^{(n+f+1)}*S-2^{(n+f+1)}$$

$$K2_{DDA}=2^{(n+f+1)}*S+2^{(n+f+2)}-2^{(n+f+1)}$$

$$K2_{DDA}=2^{(n+f+1)}*S+2^{(n+f+1)} \quad (11)$$

$$E0_{DDA}=2^{(n+f+1)}*F0$$

$$E0_{DDA}=2^{(n+f+1)}*S+2^{(n+f+1)}*S*(X0_i-X0)-2^{(n+f+1)}*(Y0_i-Y0)+2^{(n+f)} \quad (12)$$

Note that in equation (11), $-2^{(n+f+1)}$ is replaced by $2^{(n+f+2)}-2^{(n+f+1)}$. This is possible because an (n+f+2)-bit adder is used.

For DDA lines, the operation of the circuit 30 is as follows. If E (initially set to E0) is smaller than $2^{(n+f+1)}$ a step is taken in the major axis direction If E is greater than $2^{(n+f+1)}$, a step is taken in the diagonal direction. The bit representing $2^{(n+f+1)}$ is the integer carry-out bit of the accumulated fraction and is also the msb (sign) bit of the Bresenham variable. The addition is assumed to be unsigned; however, a 2's complement adder can also be used for unsigned addition, with the benefit that a negative S can be used in equation (10), (11) and (12) as well. The only difference is the generation of the overflow flag which is not being used in the illustrated embodiment.

For DDA lines, the decision to step in the major or diagonal direction is reversed relative to a normal Bresenham line draw. It should be noted that the (n+f+1) least significant bits of the Bresenham error (less ½) is the msb of the fraction of the position selected and hence, can be used for shading or anti-aliasing.

The operation of the circuit of FIG. 3 is described in connection with the flow chart of FIG. 4. In block 34, the constants K1, K2, E0 and COUNT are initialized. COUNT is set to the number of steps to be taken, i.e., the number of steps in the major direction between the endpoints. For a DDA line, constants K1, K2 and E0 are set as described in equations (10), (11) and (12). For Bresenham line draws, constants K1, K2 and E0 are set as normal. In block 36, point X,Y is drawn. Initially, point X,Y is set to $X0_i$, $Y0_i$, i.e., the closest integer location to X0,Y0. In decision block 38, COUNT is checked to determine whether it is equal to zero, which would indicate that the line is drawn. If so, the engine 30 indicates that the line is completed in block 40. The next step is dependent upon whether a DDA or a Bresenham line is being drawn in decision block 42. If a DDA line is being drawn, then DECISION is set to the inverse of SIGN in block 44. If a Bresenham line is being drawn, DECISION is set to SIGN in block 46. DECISION block 48 determines the direction of the step to be taken, and the update of the error parameter, E. If DECISION=1, K1 is output from logic 12a and is added to the previous value of E in block 50. If DECISION=0, K2 is output from logic 14a and is added to the previous value of E and Y (the minor direction) is incremented by one in block 52. In either case, X (the major direction) is incremented by one and COUNT is decremented by one in block 54. Consequently, if DECISION=1, only X will be incremented, thereby producing a step in the major direction. If DECISION=0, both X and Y will be incremented, thereby producing a diagonal step. Flow then returns to block 36 where the new point X,Y is drawn. This loop is repeated until COUNT equals 0 and the line is finished.

As described above, when the line exactly crosses the midpoint, the normal Bresenham error term would be 0. Hence, the DECISION would be to step in the major direction. However, the error term in equation (12) would be $2^{(n+f+1)}$ and diagonal stepping would be taken, which is the opposite of the normal Bresenham line. This can be corrected by biasing the initial E0 in equation (12) by −1.

Although the present invention and its advantages have been described in detail, it should be understood that various changes, substitutions and alterations can be made herein without departing from the spirit and scope of the invention as defined by the appended claims. For example, logic other than exclusive OR gate 32 could be used to selectively invert the SIGN bit from adder 14a.

What is claimed is:

1. A line draw engine for generating Bresenham lines having points defined in accordance with integer error calculations and Digital Differential Analyzer (DDA) lines having points defined responsive to floating point error calculations, comprising:

an adder for calculating an integer error term;

circuitry for generating a control signal indicative of whether said Bresenham line or said DDA line is desired;

circuitry for selectively performing a logical invert function on an output of said adder indicative of the sign of the error term responsive to said control signal; and Bresenham line draw logic coupled to said adder for drawing a point responsive to the output of said inverting circuitry, such that said Bresenham line draw logic may be used to generate both said Bresenham lines and said DDA lines.

2. The line draw engine of claim 1 wherein said inverting circuitry comprises a exclusive OR gate having a first input coupled to said control signal and a second input coupled to said output of said adder.

3. The line draw engine of claim 1 and further comprising circuitry for generating an initial error term responsive to said control signal.

4. The line draw engine of claim 1 and further comprising circuitry for generating a K1 term responsive to said control signal.

5. The line draw engine of claim 1 and further comprising circuitry for generating a K2 term responsive to said control signal.

6. The line draw engine of claim 1 wherein said output comprises the bit indicative of the sign of the Bresenham error term.

7. A line draw engine for generating Bresenham lines having points defined in accordance with integer error calculations and Digital Differential Analyzer (DDA) lines having points defined responsive to floating point error calculations, comprising:

an adder for calculating an integer error term;

circuitry for generating a control signal indicative of whether said Bresenham line or said DDA line is desired;

circuitry for generating an initial error term and K1 and K2 constants, the values of said constants determined responsive to said control signal;

circuitry for selectively performing a logical invert function on an output of said adder responsive to said control signal; and Bresenham line draw logic coupled to said adder for drawing a point and for selecting one of said K1 and K2 terms to be added to the error term responsive to the output of said inverting circuitry.

8. The line draw engine of claim 7 wherein said inverting circuitry comprises a exclusive OR gate having a first input coupled to said control signal and a second input coupled to said output of said adder.

9. The line draw engine of claim 7 wherein said output of said adder comprises the bit indicative of the sign of the Bresenham error term of said adder.

10. A method of drawing a line comprising the steps of:

determining the position of a current bit in the line;

receiving a signal indicative of whether the line is to be drawn as a Bresenham line having points defined in accordance with integer error calculations or a Digital Differential Analyzer (DDA) line having points defined responsive to floating point error calculations;

calculating a set of Bresenham parameters, the values of said parameters determined/responsive to said signal;

inputting said set of Bresenham parameters to Bresenham line draw logic;

monitoring an integer error term generated by said Bresenham logic;

selectively performing a logical invert function on a bit of said error term responsive to said signal; and calculating a next pixel position for said line with said Bresenham line draw logic responsive to said selectively inverted bit.

11. The method of claim 10 wherein said step of selectively inverting said one bit comprises the step of inverting a bit of said error term indicative of the sign of said Bresenham error term.

12. The method of claim 10 wherein said step of selectively inverting said bit comprises the step of performing an exclusive-or operation on said bit and said signal.

13. The method of claim 10 wherein said calculating step comprises the step of calculating K1, K2 and initial E0 parameters.

14. The method of claim 10 wherein said calculating step comprises the step of moving in the major direction responsive to said selectively inverted bit being in a first logical state and moving in a diagonal direction responsive to said selectively inverted bit being in a second logical state.

15. The method of claim 10 wherein said calculating step comprises the step of adding a first constant to said error term responsive to said selectively inverted bit being in a first logical state and adding a second constant to said error term responsive to said selectively inverted bit being in a second logical state.

* * * * *

UNITED STATES PATENT AND TRADEMARK OFFICE
CERTIFICATE OF CORRECTION

PATENT NO. : 5,570,463
DATED : October 29, 1996
INVENTOR(S) : Giang H. Dao

It is certified that error appears in the above-indentified patent and that said Letters Patent is hereby corrected as shown below:

Col. 3, ln. 2, delete "F(X+dx,Y+dy)=F(X,Y)+2*DY*dx-2DX,dy"; insert --F(X+dx,Y+dy)=F(X,Y)+2*DY*dx-2DX*dy--.

Col. 3, ln. 33, delete "E0=2*DY-DX+2*DY*(X0$_i$-X0)-2*DX*(Y0$_i$-Y0x5)" ; insert --E0=2*DY-DX+2*DY*(X0$_i$-X0)-2*DX*(Y0$_i$-Y0)(5)--.

Col. 4, ln. 33, delete "E0$_{DDA}$=2$^{(n+f+1)}$*F0" ; insert --E0$_{DDA}$=2$^{(n+f+1)}$*F0--

Col. 4, ln. 34, delete " E0$_{DDA}$=2$^{(n+f+1)}$*S+2$^{(n+f+1)}$*S*(X0$_i$X0)-2$^{(n+f+1)}$*(Y0$_i$-Y0)+2$^{(n+f)}$"; insert --E0$_{DDA}$=2$^{(n+f+1)}$*S+2$^{(n+f+1)}$*S*(X0$_i$-X0)-2$^{(n+f+1)}$*(Y0$_i$-Y0)+2$^{(n+f)}$--.

UNITED STATES PATENT AND TRADEMARK OFFICE
CERTIFICATE OF CORRECTION

PATENT NO. : 5,570,463
DATED : October 29, 1996
INVENTOR(S) : Giang H. Dao

It is certified that error appears in the above-indentified patent and that said Letters Patent is hereby corrected as shown below:

Col. 4, ln. 41, insert --,-- between "$2^{(n+f+1)}$" and "a".

Col. 4, ln. 42, after "direction", insert --.--.

Col. 6, ln. 35, delete "determined/responsive", insert --determined responsive--.

Signed and Sealed this

Fourth Day of March, 1997

Attest:

BRUCE LEHMAN

*Attesting Officer*  *Commissioner of Patents and Trademarks*